(12) United States Patent
Lee et al.

(10) Patent No.: US 7,630,486 B2
(45) Date of Patent: Dec. 8, 2009

(54) METHOD AND SYSTEM FOR HANDLING A QUEUED AUTOMATIC CALL DISTRIBUTOR CALL

(75) Inventors: Johnny H. Lee, San Gabriel, CA (US); Fadi R. Jabbour, Sunnyvale, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 736 days.

(21) Appl. No.: 11/231,598

(22) Filed: Sep. 20, 2005

(65) Prior Publication Data

US 2007/0071223 A1  Mar. 29, 2007

(51) Int. Cl.
H04M 3/20 (2006.01)
(52) U.S. Cl. ............ 379/265.01; 379/88.2; 379/209.01; 379/266.1; 455/414.1; 709/248
(58) Field of Classification Search ............ 379/269.01, 379/88.01–88.28, 265.01, 209.01, 266.1; 455/414.1; 709/248
See application file for complete search history.

(56) References Cited

U.S. PATENT DOCUMENTS

| | | | | |
|---|---|---|---|---|
| 4,788,715 A | 11/1988 | Lee | ............................. | 379/84 |
| 5,155,761 A * | 10/1992 | Hammond | .................. | 379/88.2 |
| 5,181,236 A | 1/1993 | LaVallee et al. | ............... | 379/67 |
| 5,311,574 A * | 5/1994 | Livanos | .................. | 379/209.01 |
| 5,329,583 A | 7/1994 | Jurgensen et al. | ........... | 379/266 |
| 5,506,898 A | 4/1996 | Costantini et al. | ........... | 379/266 |
| 5,511,112 A | 4/1996 | Szlam | ........................ | 379/88 |
| 5,526,416 A | 6/1996 | Dezonno et al. | ............. | 379/265 |
| 5,724,420 A | 3/1998 | Torgrim | ...................... | 379/372 |
| 5,774,660 A | 6/1998 | Brendel et al. | .............. | 709/201 |
| 5,857,018 A | 1/1999 | Sumner et al. | .............. | 379/266 |
| 5,905,793 A | 5/1999 | Flockhart et al. | ............ | 379/266 |
| 5,946,388 A | 8/1999 | Walker et al. | ............... | 379/266 |
| 5,951,694 A | 9/1999 | Choquier et al. | .............. | 714/15 |
| 5,991,645 A | 11/1999 | Yuen et al. | .................. | 455/568 |
| 6,002,760 A | 12/1999 | Gisby | ........................ | 379/266 |
| 6,006,264 A | 12/1999 | Colby et al. | ................. | 709/226 |
| 6,016,305 A | 1/2000 | Borst et al. | .................. | 370/234 |
| 6,046,762 A | 4/2000 | Sonesh et al. | .................. | 348/16 |

(Continued)

FOREIGN PATENT DOCUMENTS

WO    WO 99/41895    8/1999

OTHER PUBLICATIONS

IBM Technical Disclosure Bulletin, "Computerized Call Return Feature"; vol. 28, No. 11;pp. 4897-4901; IBM Corp. (5 pgs), Apr. 1986.

(Continued)

*Primary Examiner*—Gerald Gauthier
(74) *Attorney, Agent, or Firm*—Baker Botts L.L.P.

(57) ABSTRACT

A method for handling a queued automatic call distributor call includes receiving a call from an endpoint of a caller over a first connection. The call comprises a request for service. The method includes connecting the call to an automatic call distributor through a second connection and determining that the call is queued. The method includes terminating the first connection with the caller and receiving an indicator to reestablish a connection with the caller. The method also includes reestablishing a connection with the caller.

37 Claims, 2 Drawing Sheets

U.S. PATENT DOCUMENTS

| | | | |
|---|---|---|---|
| 6,049,603 A | 4/2000 | Schwartz et al. | 379/309 |
| 6,088,444 A | 7/2000 | Walker et al. | 379/266 |
| 6,128,642 A | 10/2000 | Doraswamy et al. | 709/201 |
| 6,128,657 A | 10/2000 | Okanoya et al. | 709/224 |
| 6,137,777 A | 10/2000 | Vaid et al. | 370/230 |
| 6,148,410 A | 11/2000 | Baskey et al. | 714/4 |
| 6,185,619 B1 | 2/2001 | Joffe et al. | 709/229 |
| 6,201,962 B1 | 3/2001 | Sturniolo et al. | 455/432 |
| 6,249,801 B1 | 6/2001 | Zisapel et al. | 709/105 |
| 6,263,066 B1 | 7/2001 | Shtivelman et al. | 379/266 |
| 6,263,368 B1 | 7/2001 | Martin | 709/224 |
| 6,295,354 B1 | 9/2001 | Dezonno | 379/266 |
| 6,314,178 B1 | 11/2001 | Walker et al. | 379/266.01 |
| 6,327,622 B1 | 12/2001 | Jindal et al. | 709/228 |
| 6,330,602 B1 | 12/2001 | Law et al. | 709/224 |
| 6,385,309 B1 | 5/2002 | Bennett et al. | 379/93.25 |
| 6,393,458 B1 | 5/2002 | Gigliotti et al. | 709/203 |
| 6,411,805 B1 * | 6/2002 | Becker et al. | 455/414.1 |
| 6,434,618 B1 | 8/2002 | Cohen et al. | 709/228 |
| 6,442,165 B1 | 8/2002 | Sitaraman et al. | 370/395.4 |
| 6,445,704 B1 | 9/2002 | Howes et al. | 370/392 |
| 6,473,802 B2 | 10/2002 | Masters | 709/229 |
| 6,480,885 B1 | 11/2002 | Olivier | 709/207 |
| 6,484,143 B1 | 11/2002 | Swildens et al. | 705/1 |
| 6,546,087 B2 | 4/2003 | Shaffer et al. | 379/90.01 |
| 6,546,097 B1 | 4/2003 | Peltz | 379/265.07 |
| 6,654,815 B1 * | 11/2003 | Goss et al. | 709/248 |
| 6,665,396 B1 | 12/2003 | Khouri et al. | 379/266.01 |
| 6,665,537 B1 | 12/2003 | Lioy | 455/435 |
| 6,724,885 B1 | 4/2004 | Deutsch et al. | 379/265.02 |
| 6,788,769 B1 | 9/2004 | Waites | 379/93.24 |
| 6,879,683 B1 * | 4/2005 | Fain et al. | 379/265.02 |
| 7,315,617 B2 * | 1/2008 | Shaffer et al. | 379/266.1 |
| 2004/0148332 A1 * | 7/2004 | Parolkar et al. | 709/200 |
| 2006/0109974 A1 * | 5/2006 | Paden et al. | 379/265.02 |

OTHER PUBLICATIONS

PCT; International Search Report and Written Opinion; (IS/EPO) for PCT/US2006/033077 (13 pages), Feb. 14, 2007.

U.S. Appl. No. 10/606,438, entitled *"System and Method for Tracking End Users in a Loadbalancing Environment,"* inventors Robert M. Batz, et al., filed Jun. 25, 2003, 28 pages Specification, Claims and Abstract, 1 sheet of drawings, Jun. 25, 2003.

U.S. Appl. No. 10/649,452, entitled *"System and Method for Managing Calls of an Automatic Call Distributor,"* inventors Shaffer, et al., filed Aug. 25, 2003, 34 pages Specification, Claims and Abstract, 2 sheets of drawings, Aug. 25, 2003.

U.S. Appl. No. 10/649,517, entitled *"Method and System for Utilizing Proxy Designation in a Call System,"* inventors Shaffer, et al., filed Aug. 25, 2003, 43 pages Specification, Claims and Abstract, 2 sheets of drawings, Aug. 25, 2003.

U.S. Appl. No. 09/872,688, entitled *"Method and Apparatus for Scheduling Automatic Call Distribution System Callers,"* inventors Shaffer, et al., filed May 31, 2001, 18 pages Specification, Claims and Abstract, 3 sheets of drawings, May 31, 2001.

Information Sciences Institute, "Internet Protocol, Darpa Internet Program Protocol Specification," Univ. Of Southern Calif. Marina del Rey, CA 90291 (45 pgs), Sep. 1981.

S. Deering, "Host Extensions for IP Multicasting," Stanford University (17 pgs), Aug. 1989.

* cited by examiner

METHOD AND SYSTEM FOR HANDLING A QUEUED AUTOMATIC CALL DISTRIBUTOR CALL

TECHNICAL FIELD OF THE INVENTION

This invention relates in general to automated network communication distribution and, more particularly, to a method and system for handling a queued automatic call distributor call.

BACKGROUND OF THE INVENTION

Automatic call distributors (ACDs) are specialized systems designed to match incoming requests for service, for example a telephone call, a chat or any other multi-media call or contact request with a resource that is able to provide that service, for example a human contact center agent. ACDs generally perform one or more of the following functions: (i) recognize and answer incoming contacts; (ii) review database(s) for instructions on what to do with a particular contact; (iii) receive caller input regarding the contact; (iv) use the instructions and input to identify an appropriate agent and queue the contact, often times providing a prerecorded message; and (v) connect the contact to an agent as soon as the agent is available.

In current ACD systems, when a caller calls in and all agents are busy, the caller gets queued and has to wait for an available agent. The queue time depends on how soon the agent becomes available and the number of calls already in the queue. At times a caller to a busy call center may receive an outgoing message "We are experiencing a heavy call load. Please hang up and try again later." There is no guarantee that if the user calls later, he will not receive the same message again. The most common complaint for customers dialing into call centers is the long time spent waiting in queue. Not only does this waste callers' time and money (e.g., for the cost of the call), but it consumes the bandwidth between their phone devices and telephony service providers, be it mobile minutes or network bandwidth on Voice over IP (VoIP) systems. Some systems provide functionality at the call center that allow customers to queue while not holding on the phone.

SUMMARY OF THE INVENTION

The present invention provides a method and system for handling a queued automatic call distributor call that substantially eliminates or reduces at least some of the disadvantages and problems associated with methods and systems.

In accordance with a particular embodiment, a method for handling a queued automatic call distributor call includes receiving a call from an endpoint of a caller over a first connection. The call comprises a request for service. The method includes connecting the call to an automatic call distributor through a second connection and determining that the call is queued. The method includes terminating the first connection with the caller and receiving an indicator to reestablish a connection with the caller. The method also includes reestablishing a connection with the caller.

Receiving an indicator to reestablish a connection with the caller may comprise monitoring the second connection with the automatic call distributor to receive the indicator, receiving through the second connection with the automatic call distributor a signal indicating a transfer of the call to an agent, receiving through the second connection with the automatic call distributor predefined speech indicating an answering of the call by an agent, receiving through the second connection with the automatic call distributor an indication that hold music has terminated, receiving a wait time for the queued call, receiving a SIP communication indicating a transfer of the call to an agent or receiving from the endpoint of the caller a request for connection. Reestablishing a connection with the caller may comprise ringing the endpoint of the caller. The method may also include communicating a hold time to the caller.

In accordance with another embodiment, a system for handling a queued automatic call distributor call includes an interface operable to receive a call from an endpoint of a caller over a first connection. The call comprises a request for service. The system also includes a processor coupled to the interface and operable to connect the call to an automatic call distributor through a second connection, determine that the call is queued, terminate the first connection with the caller, receive an indicator to reestablish a connection with the caller and reestablishing a connection with the caller.

Technical advantages of particular embodiments include a method and system for handling a queued ACD call that allows a caller of an ACD whose call has been queued by the ACD to disconnect his endpoint connection while an intermediary device, such as a PBX, gateway, call manager or otherwise maintains a connection with the ACD to hold the caller's place in the queue. At or near the time when the call is transferred to an available ACD agent for handling, the connection with the caller may be reestablished so that the caller can communicate with the ACD agent. Accordingly, use of call resources such as bandwidth (e.g., cell phone or other call minutes) and processing resources used to maintain the voice path or other connection on the caller's endpoint may be reduced. In addition, use of other resources may be reduced such as endpoint power (e.g., cell phone power). The amount of time a customer spends waiting on the queued call to the serviced is reduced.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
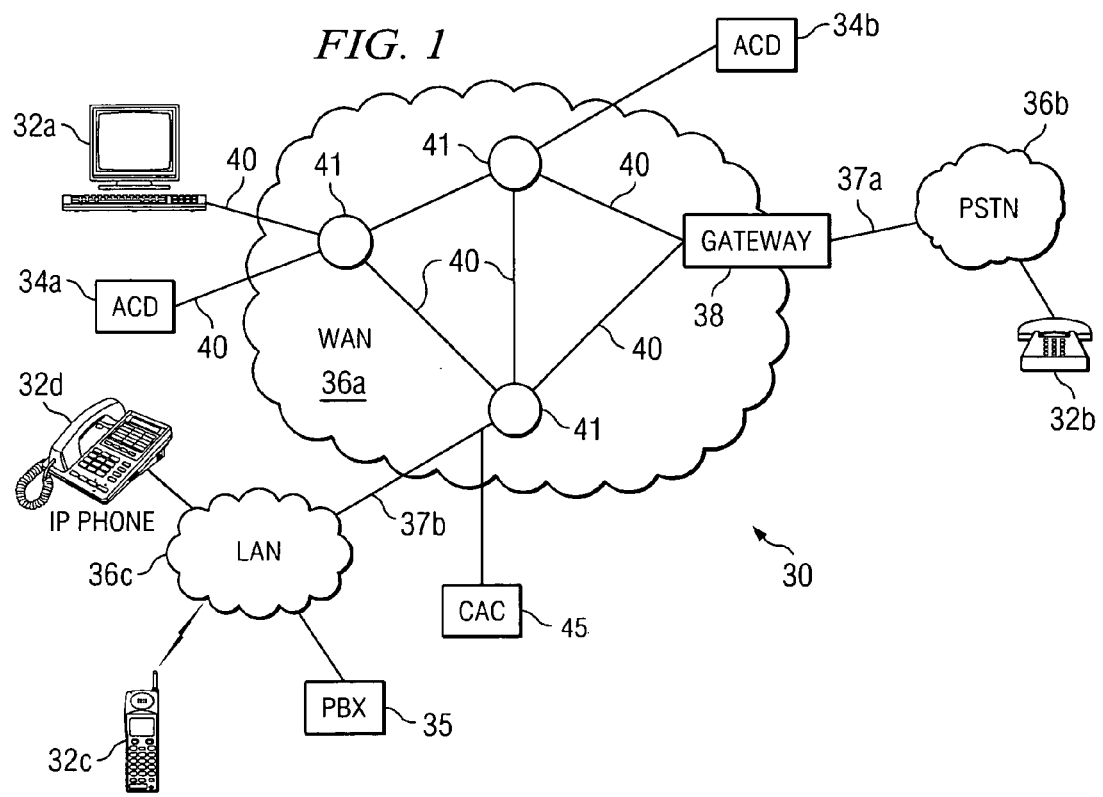
FIG. 1 illustrates a communication system including a plurality of endpoints operable to communicate among each other and a plurality of automatic call distributors, in accordance with a particular embodiment.

FIG. 1 illustrates a communication system 30 including a plurality of endpoints 32a-32d having the ability to establish communication sessions between each other and/or automatic call distributors (ACDs) 34a-34b, using one or more of communication networks 36a-36c. ACDs are specialized communication systems designed to route incoming calls to available agents. In some cases ACDs ensure that calls are properly and/or evenly distributed. For the purposes of this specification, "automatic call distributor" or "ACD" shall refer to any combination of hardware, software and/or embedded logic which is operable to automatically distribute incoming calls, and "calls" and "contacts" shall include requests for service transmitted using any audio and/or video means, including signals, data or messages transmitted through voice devices, text chat, web sessions, facsimile, instant messaging, SMS and e-mail. Thus, references herein to a call shall also refer to a contact and vice versa.

Particular embodiments provide a system and method for handling a queued ACD call that allows a caller of an ACD whose call has been queued by the ACD to disconnect his endpoint connection while an intermediary device, such as a PBX, gateway, call manager or otherwise maintains a connection with the ACD to hold the caller's place in the queue. At or near the time when the call is transferred to an available ACD agent for handling, the connection with the caller may be reestablished so that the caller can communicate with the ACD agent. Accordingly, use of call resources such as bandwidth (e.g., cell phone or other call minutes) and processing resources used to maintain the voice path or other connection on the caller's endpoint may be reduced. In addition, use of other resources may be reduced such as endpoint power (e.g., cell phone power). The amount of time a customer spends waiting on the queued call to the serviced is reduced.

In the illustrated embodiment, communication network 36a is a wide area network (WAN) that enables communication between a plurality of endpoints 32a-32d and automatic call distributors 34a-34b distributed across multiple cities and geographic regions. In another embodiment, a single, central automatic call distributor may be used, which distributes incoming calls to agents distributed across multiple cities and geographic regions. Communication network 36b is a public switched telephone network (PSTN) and couples endpoint 32b with communication network 36a through gateway 38. Communication network 36c is a local area network (LAN), which couples endpoints 32c and 32d and private branch exchange (PBX) 35 with communication network 36a. Accordingly, users of endpoints 32a-32d and automatic call distributors 34a-34b can establish communication sessions between and among each network component coupled for communication with one or more of networks 36a-36c. Communication links 37a and 37b couple communication networks 36a and 36b, and communication networks 36a and 36c, respectively. A call admission control (CAC) system 45 may be used to monitor the amount of bandwidth available over link 37b.

Communication network 36a includes a plurality of segments 40 and nodes 41 that couple endpoint 32a with automatic call distributors 34a and 34b, gateway 38, and communication networks 36b-36c. Therefore, a user of endpoint 32a is provided with access to endpoints 32b-32d, and automatic call distributors 34a-34b. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or automatic call distributors 34a-34b.

In a particular embodiment, communication network 36a employs voice communication protocols that allow for the addressing or identification of endpoints, nodes, and/or automatic call distributors coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, automatic call distributors 34a-34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other devices capable of performing telephony functions over an IP network.

Components of communication system 30 may utilize session initiation protocol (SIP) technology in the transmission of audio, video or other data across the system. As a result, users of endpoints 32 may be identified by components of system 30 according to a uniform reference identifier (URI), such as a user's e-mail address, or other suitable identifier so that a user may be located, monitored and/or contacted through presence detection technology. The use of presence detection by components of system 30 enable the components to capture information about various communication devices, or endpoints, available to a user and their status, such as whether a cellular phone is switched on or whether a user is logged into a personal computer (PC). The versatility of presence enables it to be used in both IP components, such as IP phone 32*d*, and other, non-IP components, such as components of PSTN 36*b*. For example, gateway 38 may comprise a SIP/PSTN gateway so that components coupled to PSTN 36*b* may utilize features and capabilities available through SIP technology.

It will be recognized by those of ordinary skill in the art that endpoints 32*a*-32*d*, automatic call distributors 34*a*-34*b*, and/or gateway 38 may be any combination of hardware, software, and/or encoded logic that provides communication services to a user. For example, endpoints 32*a*-32*d* may include a telephone, a computer running telephony software, a video monitor, a camera, an IP phone, a cell phone or any other communication hardware, software, and/or encoded logic that supports the communication of packets of media (or frames) using communication network 36*a*. Endpoints 32*a*-32*d* may also include unattended or automated systems, gateways, other intermediate components, or other devices that can establish media sessions. Although FIG. 1 illustrates a particular number and configuration of endpoints, automatic call distributors, segments, nodes, and gateways, communication system 30 contemplates any number or arrangement of such components for communicating media.

Figure 2:
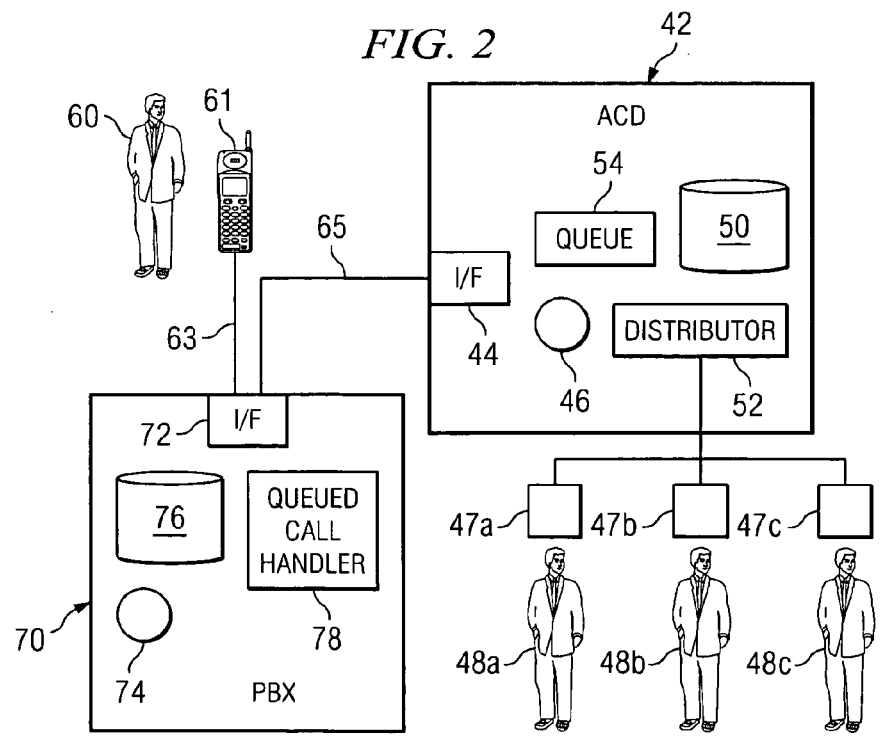
FIG. 2 illustrates a PBX and an automatic call distributor in more detail, in accordance with a particular embodiment.

FIG. 2 illustrates a PBX 70 and an ACD 42 in more detail, in accordance with a particular embodiment. ACD 42 may include the same or similar components and operate in a similar manner to ACDs 34 of FIG. 1, such as ACD 34*a*. PBX 70 may include the same or similar components and may operate in a similar manner to PBX 35 of FIG. 1. FIG. 2 also illustrates a caller 60 and the caller's mobile phone endpoint 61. For example, caller 60 and associated endpoint 61 may be part of an entity that uses PBX 70 to provide telecommunication services for the entity. Endpoint 61 is connected to PBX 70 through connection 63, and PBX 70 is connected to ACD 42 through connection 65. Connections 63 and 65 may represent connections through one or more communication networks including any suitable network components such as nodes, segments and call managers. FIG. 2, as further discussed below, illustrates example functionality provided for queued ACD calls in particular embodiments. In this embodiment PBX 70 provides this functionality, however in other embodiments other network components, such as a gateway, proxy or other intermediate device between a caller's endpoint and an ACD may provide such functionality.

ACD 42 includes an interface or input ports 44 which couples ACD 42 with callers. When a call is received at ACD 42, a processor 46 determines which of a plurality of agents 48*a*-48*c* should receive the call using endpoints 47*a*-47*c*, respectively. Endpoints 47*a*-47*c* may comprise PCs, IP phones, cell phones or other devices which may be used by agents to communicate on a call. Processor 46 may use a memory lookup, a database or other memory module, such as memory module 50, in determining which agent should receive the call. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component. Agent endpoints 47*a*-47*c* are logically illustrated as coupled to ACD 42 and distributor 52. In particular embodiments, agent endpoints may be coupled to PBX 70 (e.g., through one or more communication network components) for the call transfer process and may communicate with ACD 42, for example, through interface 49. The actual method of connection between agent endpoints 47 and ACD 42 may vary in different embodiments.

ACD 42 uses processor 46 to monitor conditions of the ACD, such as the number, type or characteristics of calls in queue 54. It will be recognized by those of ordinary skill in the art that ACD 42 may include any number of processors or memory modules to accomplish the functionality and features described herein. The processors 46, memory modules 50 and other components associated with ACD 42 may be centrally located (local) with respect to one another, or distributed throughout one or more communication networks.

If a suitable agent is available to receive the incoming call, a distributor 52 of ACD 42 distributes the call to such agent for connection. Such connection may comprise, for example, facilitating the coupling the user or caller of the call with the suitable agent if the call comprises a voice call. If a suitable agent is not available, the call may be placed into a queue 54 in order to wait for an appropriate agent(s). In this embodiment, ACD 42 has one queue 54; however other embodiments of the present invention may have none or more than one queue 54. The selection of which particular queue to place an incoming call may depend on the type of customer making the call, the type of service requested in the call or any other characteristic or condition relating to the call or ACD 42. While a caller is waiting for an agent, ACD 42 may perform one or more of several functions including data collection from the user, playing of pre-recorded messages, playing music on hold (MOH) or performing other automated process. As soon as a suitable agent becomes available, distributor 52 distributes the call to the appropriate agent.

PBX 70 includes an interface 72 which couples PBX 70 with other components of a communication system, such as communication system 30. PBX 70 also includes a processor 74, memory module 76 and a queued call handler 78. Processor 74 may be a microprocessor, controller or any other suitable computing device, resource or combination of hardware, software, and/or encoded logic that allows processor 74 to, either alone or with other PBX components such as queued call handler 78, provide the functionality of PBX 70 described herein. Memory module 76 may be any form of volatile or non-volatile memory including, without limitation, magnetic media, optical media, random access memory (RAM), read-only memory (ROM), removable media or any other suitable local or remote memory component. Memory module 76 may include and store any suitable information needed for PBX 70 to perform the functionality described herein. For example, memory module 76 may include information associated with endpoints and their users that may be connected to PBX, such as extension information.

Queued call handler 78 may include any hardware, software or embedded logic, such as a microprocessor, controller or any other suitable computing device or resource, that maintains a connection with ACD 42 while allowing a caller of a queued ACD call to terminate his endpoint connection. Queued call handler 78 also determines, through any suitable method such as those described below, when it is time to reestablish a connection with the caller's endpoint to enable the caller to communicate with an ACD agent. Queued call handler 78 may provide its functionality in combination with processor 74. While queued call handler 78 is illustrated in PBX 70, in particular embodiments it may reside or be distributed in one or more locations throughout a communication network.

In the illustrated embodiment, PBX 70 provides functionality to enable a caller of ACD 42 whose call has been queued to terminate the caller's endpoint connection while still maintaining his place in queue 54 of ACD 42. Thus, PBX 70 acts as a proxy for caller 60 on the call to ACD 42. In particular embodiments, this functionality may be invoked by the caller.

PBX 70 will stay on the call in queue, while disconnecting the connection between the PBX and the caller's endpoint 61. PBX 70 may determine when to reestablish the connection with endpoint 61 through any of a variety of methods and heuristics. For example, queued call handler 78 may utilize methods such as listening for a ring indicating a transfer of the call to an agent 48, using a heuristic based on an announced wait time, listening for a particular pattern of speech when an agent answers (e.g., "hello") and waiting for music on hold (MOH) to end to determine an appropriate time to reestablish a connection with the caller's endpoint 61. Some of these heuristics may require a connection between endpoint 61 and PBX 70 to be reestablished before the call is transferred and/or connected to an agent 48 and ACD 42 and may still require some wait time for the caller. After detecting that the call is being routed to an agent 48, PBX 70 can reestablish the connection with endpoint 61 by ringing the endpoint thus notifying caller 60 that it is time to get back on the ACD call.

In some embodiments, caller 60 may always elect to return to the call at anytime by invoking the service again. At the same time, if ACD 42 plays queue position or estimated wait time prompts, PBX 70 may receive this information and communicate it to caller 60 using endpoint 61 or another endpoint. Such communication may be made using any suitable communication method, such as e-mail, SMS, IM or voice prompt.

As an example in operation, caller 60 uses endpoint 61 which may comprise, for example, an office phone of the caller, to call ACD 42. The call travels through PBX 70 to ACD 42. As indicated above, the call travels through connection 63 to reach PBX 70 and through connection 65 to reach ACD 42. In some cases caller 60 may have to navigate through an ACD menu, such as via an interactive voice response (IVR) system. ACD 42 queues the call to wait for a suitable agent 48 to become available to handle the call. In some cases, the ACD may provide an estimated wait time, such as ten minutes. Caller 60 may press a key on his endpoint 61 to invoke the functionality described herein. Caller 60 may then hang up his endpoint as PBX 70 disconnects connection 63 with the endpoint. Meanwhile, PBX 70 maintains connection 65 with ACD 42 to hold the place in queue 54 for caller 60. Queued call handler 78 may then use any of a variety of methods to determine an appropriate time to reestablish the connection with endpoint 61. In some cases, queued call handler 78 may monitor connection 65 with the ACD and may receive an indicator to reestablish the connection with the caller. Such an indicator may include, for example, a signal indicating a transfer to an agent (e.g., such as a ring), predefined speech communicated along connection 65 indicating a transfer to an agent, the termination of MOH, the end or approximate end of a given wait time or a SIP communication indicating a transfer of the call to an agent. Automatic speech recognition (ASR) may be used by the queued call handler in some of these methods. In some cases, queued call handler 78 may play a repeating prompt over connection 65 that instructs an agent to press a particular key, such as "#," when the agent answers the call transferred from the queue. Thus, the pressing of this key may serve as the indicator for the call handler to reestablish the connection with the caller's endpoint. In some embodiments, camp-on features and functionality may be used by PBX 70 to determine when to reestablish connection with the caller. The choice of a particular method to determine when it is appropriate to reestablish a connection with the caller's endpoint (e.g., when the queued call has been transferred to an agent or when it is near such a transfer) may be made using any suitable criteria. In some cases, the method may be chosen by the caller or by a system administrator or operator. In some situations the method used may be determined by operational constraints of the particular ACD called.

Once the call handler of the PBX determines it is time to reestablish the connection with endpoint 61, it may ring the endpoint 61 so that caller 60 may communicate with an ACD agent. In some cases, a wait time may be communicated to the caller. Caller 60 may decide to call back the PBX near the end of the wait time or at any other time. In these cases, receiving such a call from caller 60 may be the indicator that PBX receives to reestablish the connection between endpoint 61 and the PBX.

As indicated above, while embodiments discussed with respect to FIG. 2 utilize a PBX to provide functionality for handling queued calls described herein, it should be understood that other intermediary network components may be used to provide this functionality, such as a call manager, a proxy component or a gateway. Such intermediary components will be able to maintain a connection with an ACD or call center while a call is queued to allow the original caller to terminate his endpoint connection with the intermediary component and determine, through monitoring the connection with the ACD or otherwise, when it is appropriate to reestablish the connection between the caller's endpoint and the intermediary component.

Figure 3:
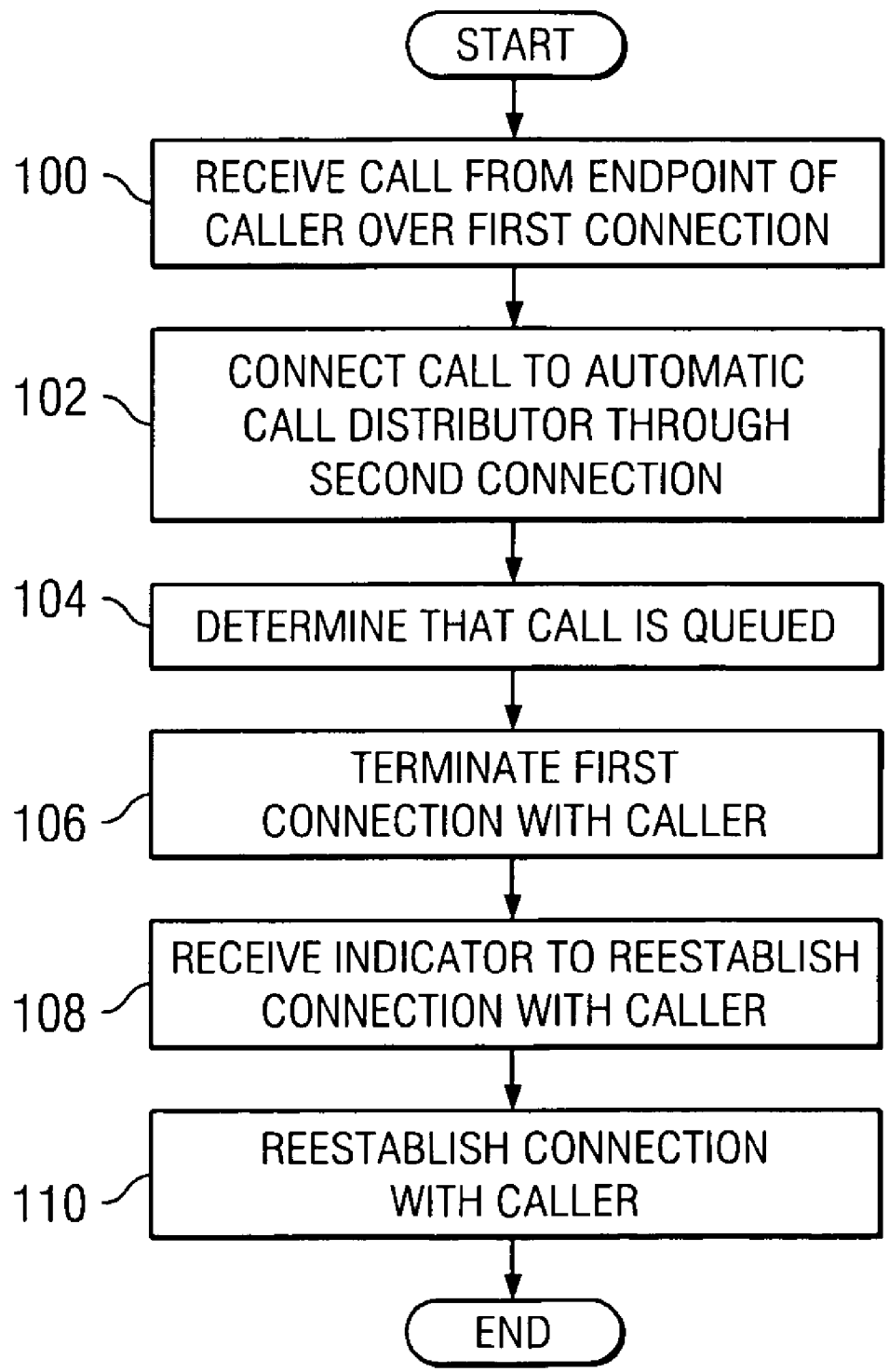
FIG. 3 illustrates a method for handling a queued automatic call distributor call, in accordance with a particular embodiment.

FIG. 3 is a flowchart illustrating a method for handling a queued automatic call distributor call in accordance with a particular embodiment. The method begins at step 100 where a call is received from an endpoint of a caller over a first connection. The call may comprise a request for service from an ACD. The call may be received at a PBX, gateway, call manager or other network component between the endpoint of the caller and the ACD. For example, the call may be received at a component of an entity or a network of which the caller is associated, such as a PBX of a business or a gateway of a network providing personal telecommunications services to users. The first connection may comprise one or more communication links through one or more communication networks.

At step 102 the call is connected to an automatic call distributor through a second connection. For example, the PBX, gateway, call manager or other intermediary device may connect the call to an automatic call distributor (e.g., may itself call the automatic call distributor) based on a phone number or other information used by the caller to make the original call. Functionality of the intermediary device described herein may be performed by a processor which may include a queued call handler of the intermediary device. The second connection may include one or more communication links through one or more communication networks. At step 104, it is determined that the call has been queued at the ACD, for example, to wait for a suitable agent to become available to handle the call. Such a determination may be made through any suitable method, such as by monitoring the second connection for a signal or indication that the call has been queued. In some cases this determination may be made by receiving, through the caller's endpoint or otherwise, a signal from the caller indicating that the call has been queued. Such a signal may act as an instruction for the intermediary device to perform the steps below to enable the caller to maintain his place in queue while not having to maintain the first connection between the caller's endpoint and the intermediary device.

At step 106, the first connection with the caller is terminated. For example, the intermediary device may terminate the connection to allow the caller to hang up his endpoint or in response to the caller hanging up his endpoint. The intermediary device maintains the second connection with the ACD when the first connection is terminated. Thus, call resources including bandwidth such as call minutes or processing resources are saved while the call is queued at the ACD awaiting a transfer to an agent.

At step 108, an indicator is received to reestablish a connection with the caller. This indicator may comprise, for example, a signal that the call has been transferred out of the queue to an ACD agent. This signal may come from the ACD. In some cases the intermediary device may monitor the second connection with the ACD for the indicator. In some embodiments, the intermediary device may continuously play a message to the ACD for an agent to transmit a transfer signal when the call is transferred to an agent. Thus, the indicator indicating a transfer of the call may include the transfer signal received from the agent to whom the call is transferred upon such transfer. The received indicator may also include predefined speech indicating an answering of the call by an agent (e.g., speech such as "hello" received through ASR functionality of the intermediary device) or the termination of hold music played by the ACD while the call has been queued. In some cases, the ACD may communicate an estimated wait time for the queued call, and the received indicator may include the determination by the intermediary device that such wait time has elapsed or is near elapsing. The received indicator may also include a SIP communication received from the ACD that indicates a transfer of the call to an agent.

In some embodiments, the receipt of the indicator to reestablish a connection with the caller may include a request from the caller (e.g., through the caller's endpoint) to reestablish the connection between the endpoint and the intermediary device. For example, the intermediary device may communicate an estimated hold time received from the ACD to the caller, and the caller may call back the intermediary device at or near the end of the hold time. This call back from the user may serve as the receipt of an indicator to reestablish a connection with the caller. Thus, the language of step 108 may include the situation where the user calls back (e.g., calling the ACD, the intermediary device or otherwise) to check on the status of the call in the queue.

At step 110, a connection with the caller (e.g., with the caller's endpoint) is reestablished so that the caller may communicate with the ACD agent handling the call. In some cases this may include the intermediary device ringing the endpoint of the caller upon response to receiving the indicator to reestablish a connection with the caller. For example, once the intermediary device determines that the call has been transferred to an agent or is near transfer, it may reestablish the connection between the caller's endpoint and the intermediary device. Since the connection between the intermediary device and the ACD has been maintained to maintain the caller's place in the queue, the caller is now connected to the ACD via the intermediary device.

Some of the steps illustrated in FIG. 3 may be combined, modified or deleted where appropriate, and additional steps may also be added to the flowchart. Additionally, steps may be performed in any suitable order without departing from the scope of the invention.

Technical advantages of particular embodiments include a system and method for handling a queued ACD call that allows a caller of an ACD whose call has been queued by the ACD to disconnect his endpoint connection while an intermediary device, such as a PBX, gateway, call manager or otherwise maintains a connection with the ACD to hold the caller's place in the queue. At or near the time when the call is transferred to an available ACD agent for handling, the connection with the caller may be reestablished so that the caller can communicate with the ACD agent. Accordingly, use of call resources such as bandwidth (e.g., cell phone or other call minutes) and processing resources used to maintain the voice path or other connection on the caller's endpoint may be reduced. Bandwidth between the caller's endpoint and a telephone system or network may be reduced. In addition, use of other resources may be reduced such as endpoint power (e.g., cell phone power). The amount of time a customer spends waiting on the queued call to the serviced is reduced.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30, automatic contact distributor 42 and PBX 70, these elements may be combined, rearranged or positioned in order to accommodate particular routing architectures or needs. In addition, any of these elements, including, for example, queued call handler 78, may be provided as separate external components to communication system 30, automatic contact distributor 42 or PBX 70 where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for handling a queued automatic call distributor call, comprising:
    receiving a call from an endpoint of a caller over a first connection, the call comprising a request for service;
    connecting the call to an automatic call distributor through a second connection;
    determining that the call is queued;
    terminating the first connection with the caller while maintaining the second connection with the automatic call distributor;
    receiving an indicator to reestablish a connection with the caller; and
    reestablishing a connection with the caller.

2. The method of claim 1, wherein receiving an indicator to reestablish a connection with the caller comprises monitoring the second connection with the automatic call distributor to receive the indicator.

3. The method of claim 1, wherein receiving an indicator to reestablish a connection with the caller comprises receiving through the second connection with the automatic call distributor a signal indicating a transfer of the call to an agent.

4. The method of claim 3:
    further comprising communicating a message to the automatic call distributor over the second connection for an agent to transmit a transfer signal when the call is transferred to an agent; and
    wherein receiving through the second connection with the automatic call distributor a signal indicating a transfer of the call to an agent comprises receiving through the second connection the transfer signal indicating the transfer of the call to an agent.

5. The method of claim 1, wherein receiving an indicator to reestablish a connection with the caller comprises receiving through the second connection with the automatic call distributor predefined speech indicating an answering of the call by an agent.

6. The method of claim 1, wherein receiving an indicator to reestablish a connection with the caller comprises receiving through the second connection with the automatic call distributor an indication that hold music has terminated.

7. The method of claim 1, wherein receiving an indicator to reestablish a connection with the caller comprises receiving a wait time for the queued call.

8. The method of claim 1, wherein receiving an indicator to reestablish a connection with the caller comprises receiving a SIP communication indicating a transfer of the call to an agent.

9. The method of claim 1, wherein reestablishing a connection with the caller comprises ringing the endpoint of the caller.

10. The method of claim 1, wherein receiving an indicator to reestablish a connection with the caller comprises receiving from the endpoint of the caller a request for connection.

11. The method of claim 10:
further comprising communicating a hold time to the endpoint of the caller; and
wherein receiving from the endpoint of the caller a request for connection comprises receiving from the endpoint of the caller a request for connection upon approximate elapsing of the hold time.

12. The method of claim 1, further comprising communicating a hold time to the caller.

13. A system for handling a queued automatic call distributor call, comprising:
an interface operable to receive a call from an endpoint of a caller over a first connection, the call comprising a request for service; and
a processor coupled to the interface and operable to:
connect the call to an automatic call distributor through a second connection;
determine that the call is queued;
terminate the first connection with the caller while maintaining the second connection with the automatic call distributor;
receive an indicator to reestablish a connection with the caller; and
reestablishing a connection with the caller.

14. The system of claim 13, wherein a processor operable to receive an indicator to reestablish a connection with the caller comprises a processor operable to monitor the second connection with the automatic call distributor to receive the indicator.

15. The system of claim 13, wherein a processor operable to receive an indicator to reestablish a connection with the caller comprises a processor operable to receive through the second connection with the automatic call distributor a signal indicating a transfer of the call to an agent.

16. The system of claim 13, wherein:
the processor is further operable to communicate a message to the automatic call distributor over the second connection for an agent to transmit a transfer signal when the call is transferred to an agent; and
a processor operable to receive through the second connection with the automatic call distributor a signal indicating a transfer of the call to an agent comprises a processor operable to receive through the second connection the transfer signal indicating the transfer of the call to an agent.

17. The system of claim 13, wherein a processor operable to receive an indicator to reestablish a connection with the caller comprises a processor operable to receive through the second connection with the automatic call distributor predefined speech indicating an answering of the call by an agent.

18. The system of claim 13, wherein a processor operable to receive an indicator to reestablish a connection with the caller comprises a processor operable to receive through the second connection with the automatic call distributor an indication that hold music has terminated.

19. The system of claim 13, wherein a processor operable to receive an indicator to reestablish a connection with the caller comprises a processor operable to receive a wait time for the queued call.

20. The system of claim 13, wherein a processor operable to receive an indicator to reestablish a connection with the caller comprises a processor operable to receive a SIP communication indicating a transfer of the call to an agent.

21. The system of claim 13, wherein a processor operable to reestablish a connection with the caller comprises a processor operable to ring the endpoint of the caller.

22. The system of claim 13, wherein a processor operable to receive an indicator to reestablish a connection with the caller comprises a processor operable to receive from the endpoint of the caller a request for connection.

23. The system of claim 22, wherein:
the processor is further operable to communicate a hold time to the endpoint of the caller; and
a processor operable to receive from the endpoint of the caller a request for connection comprises a processor operable to receive from the endpoint of the caller a request for connection upon approximate elapsing of the hold time.

24. The system of claim 13, wherein the processor is further operable to communicate a hold time to the caller.

25. A system for handling a queued automatic call distributor call, comprising:
means for receiving a call from an endpoint of a caller over a first connection, the call comprising a request for service;
means for connecting the call to an automatic call distributor through a second connection;
means for determining that the call is queued;
means for terminating the first connection with the caller while maintaining the second connection with the automatic call distributor;
means for receiving an indicator to reestablish a connection with the caller; and
means for reestablishing a connection with the caller.

26. Logic embodied in a computer readable medium, the computer readable medium comprising code operable to:
receive a call from an endpoint of a caller over a first connection, the call comprising a request for service;
connect the call to an automatic call distributor through a second connection;
determine that the call is queued;
terminate the first connection with the caller while maintaining the second connection with the automatic call distributor;
receive an indicator to reestablish a connection with the caller; and
reestablish a connection with the caller.

27. The medium of claim 26, wherein code operable to receive an indicator to reestablish a connection with the caller comprises code operable to monitor the second connection with the automatic call distributor to receive the indicator.

28. The medium of claim 26, wherein code operable to receive an indicator to reestablish a connection with the caller comprises code operable to receive through the second connection with the automatic call distributor a signal indicating a transfer of the call to an agent.

29. The medium of claim 28, wherein:
- the code is further operable to communicate a message to the automatic call distributor over the second connection for an agent to transmit a transfer signal when the call is transferred to an agent; and
- code operable to receive through the second connection with the automatic call distributor a signal indicating a transfer of the call to an agent comprises code operable to receive through the second connection the transfer signal indicating the transfer of the call to an agent.

30. The medium of claim 26, wherein code operable to receive an indicator to reestablish a connection with the caller comprises code operable to receive through the second connection with the automatic call distributor predefined speech indicating an answering of the call by an agent.

31. The medium of claim 26, wherein code operable to receive an indicator to reestablish a connection with the caller comprises code operable to receive through the second connection with the automatic call distributor an indication that hold music has terminated.

32. The medium of claim 26, wherein code operable to receive an indicator to reestablish a connection with the caller comprises code operable to receive a wait time for the queued call.

33. The medium of claim 26, wherein code operable to receive an indicator to reestablish a connection with the caller comprises code operable to receive a SIP communication indicating a transfer of the call to an agent.

34. The medium of claim 26, wherein code operable to reestablish a connection with the caller comprises code operable to ring the endpoint of the caller.

35. The medium of claim 26, wherein code operable to receive an indicator to reestablish a connection with the caller comprises code operable to receive from the endpoint of the caller a request for connection.

36. The medium of claim 35, wherein:
- the code is further operable to communicate a hold time to the endpoint of the caller; and
- code operable to receive from the endpoint of the caller a request for connection comprises code operable to receive from the endpoint of the caller a request for connection upon approximate elapsing of the hold time.

37. The medium of claim 26, wherein the code is further operable to communicate a hold time to the caller.

* * * * *

UNITED STATES PATENT AND TRADEMARK OFFICE
CERTIFICATE OF CORRECTION

PATENT NO. : 7,630,486 B2 Page 1 of 1
APPLICATION NO. : 11/231598
DATED : December 8, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Second Day of November, 2010

David J. Kappos
*Director of the United States Patent and Trademark Office*